(12) United States Patent
Shaw et al.

(10) Patent No.: US 8,333,212 B2
(45) Date of Patent: Dec. 18, 2012

(54) RUPTURE DISC WITH MACHINED LINE OF OPENING

(75) Inventors: Bon F. Shaw, Blue Springs, MO (US); Bradford T. Stilwell, Blue Springs, MO (US); Michael D. Krebill, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 1184 days.

(21) Appl. No.: 12/133,266

(22) Filed: Jun. 4, 2008

(65) Prior Publication Data
US 2009/0302035 A1  Dec. 10, 2009

(51) Int. Cl.
*F16K 43/00* (2006.01)
(52) U.S. Cl. .................. 137/15.18; 137/68.27; 220/89.2
(58) Field of Classification Search ............... 137/68.19, 137/68.21, 68.23, 68.27, 15.18, 15.19; 220/89.2; 72/379, 379.2, 379.6; 409/132, 191; 29/890.12
See application file for complete search history.

(56) References Cited

U.S. PATENT DOCUMENTS

| | | | |
|---|---|---|---|
| 3,484,817 A * | 12/1969 | Wood | 220/89.2 |
| 4,122,595 A | 10/1978 | Wood et al. | |
| 4,597,505 A | 7/1986 | Mozley et al. | |
| 4,655,070 A | 4/1987 | Clift | |
| 4,669,626 A | 6/1987 | Mozley | |
| 4,803,136 A | 2/1989 | Bowsky et al. | |
| 5,267,666 A * | 12/1993 | Hinrichs et al. | 220/89.2 |
| 6,077,002 A * | 6/2000 | Lowe | 409/132 |
| 6,178,983 B1 | 1/2001 | Culliinane et al. | |
| 2006/0237457 A1 | 10/2006 | Shaw et al. | |

FOREIGN PATENT DOCUMENTS
WO    9001634 A1    2/1990

OTHER PUBLICATIONS
Preliminary Examination and Search Report for Taiwan Patent Application No. 098103189, issued Mar. 9, 2012, 7 pages.

\* cited by examiner

*Primary Examiner* — Kevin Lee
*Assistant Examiner* — Macade Brown
(74) *Attorney, Agent, or Firm* — Hovey Williams LLP (57) ABSTRACT

A reverse acting rupture disc and methods of forming the same are provided. Generally, the rupture disc comprises a bulged portion and a circumscribing flange area surrounding the bulged portion. The bulged portion includes a mechanically formed line-of-opening recess comprising a singular channel. In certain embodiments, the mechanical process by which the recess is formed utilizes a high-speed mill which removes a portion of metal from the bulged portion of the disc without disrupting the substantially uniform metallic grain structure of the metal adjacent the channel.

39 Claims, 6 Drawing Sheets

RUPTURE DISC WITH MACHINED LINE OF OPENING

BACKGROUND OF THE INVENTION

1. Field of the Invention

The present invention is generally directed toward rupture discs, specifically reverse acting discs, having a machined line of opening formed therein. The line of opening presents as a recess and is formed by a mechanical milling operation whereby metal is removed from the bulged portion of the disc without altering or disrupting the substantially uniform metallic grain structure of the metal adjacent the recess.

2. Description of the Prior Art

It has long been known to provide bulged reverse acting rupture discs having a line-of-weakness recess or score line in one face of the disc bulge. The lines of weakness or score lines have generally been cross scores, or a circumferential line-of-weakness recess in the concave face of the disc where the line-of-weakness recess or score line defines the area of the disc that opens upon reversal. Without a line-of-weakness recess defining the opening through the disc upon severing of the disc along the line-of-weakness recess, a bulged disc will reverse but not necessarily fully open. In the case of a circumferentially extending line-of-weakness recess, the line of weakness normally is not a continuous line, thus presenting a hinge area that prevents fragmentation of the central area of the disc upon reversal and opening. A cross scored disc forms four petals that bend outwardly upon reversal of the disc, again preventing fragmentation of the petals. Circumferential score lines or lines of weakness are preferred in low pressure applications because of the larger opening presented upon severing of the disc along the arcuate score line, as compared with a cross scored disc.

Lines of weakness have heretofore been formed in reverse acting rupture discs by a metal scoring die, use of a laser that erodes a groove in the disc, or by chemical etching or electropolishing to remove metal from the disc along a desired line. All of these past reverse acting discs have presented unresolved manufacturing difficulties, or have experienced operational problems in various application uses.

Metal scoring dies work harden the metal material, thus changing the grain structure and density of the metal at the score line. The material surrounding a score line formed with a metal scoring die is work hardened during the scoring process, thus increasing the brittleness of the metal and creating stress zones. The brittleness and increased stress zones of the metal limit the service life of the rupture disc as a result of fatigue cracking and stress corrosion. Metal scoring depths required for satisfactory operation profoundly alter the original bulged dome strength making it difficult to predict the pressure ultimately required to reverse the rupture disc during the initial bulging operation of the disc prior to scoring. Consequently, it is very difficult to produce a reverse acting bulged rupture disc having a score line formed with a scoring die that will both open reliably and withstand multiple successive pressure cycles.

It has also been proposed to form a score line in a reverse acting rupture disc using a laser beam. These proposals have not proved commercially satisfactory for a number of reasons. The reflectivity of the metal makes it difficult to control the penetration of the beam into the thickness of the metal and thereby form a smooth groove of uniform depth along the length of the intended line-of-weakness recess. Furthermore, lasers significantly heat and burn the disc, oxidize the material and change the metallurgy of the metal. Discs having lines of weakness burned by a laser have been found to be unsatisfactory in use, not only from the standpoint of unreliable openings at required pressure relief values, but also having undesirable cycle life.

Chemical etching of a rupture disc having a segmented resist layer defining a line of weakness has also been suggested in the prior art, as for example shown and described in U.S. Pat. Nos. 4,122,595, 4,597,505, 4,669,626, and 4,803,136. The patentee in the '595 patent suggests screen printing of a resist material on a flat rupture disc where the screen has openings presenting a pattern of the desired line of weakness. After bulging of the disc, an acid solution is sprayed onto the disc to etch a line of weakness coincident with the area of the disc unprotected by the resist material. The metal surface of the disc material is somewhat irregular and not perfectly smooth because the individual side-by-side grains have peaks with valley structure between the grains. Therefore, when an acid etchant agent is applied to the surface of the metal, that agent does not act uniformly across the surface of the metal. Instead, the etchant is more aggressive in the valleys between the grains than in eroding the higher surface peaks of the metal grains. The etchant agent contained in the valley cavities is believed to not only more rapidly erode the metal in the valley area as compared with the surrounding peak areas of the grains, but to also do so more efficiently. The attendant result of the etching process is to exaggerate the roughness of the metal surface, with the degree of surface irregularity increasing with time of exposure of the metal to the enchant agent. The rupture discs are manufactured from materials that are inherently corrosion resistant, such as stainless steel, INCONEL, Hastalloy-C, and MONEL. As a consequence, subjection of these inherently corrosion resistant materials to an etchant acid requires that the etchant agent remain in contact with the surface of the metal for extended periods of time in order to erode away a groove that typically is as much as 70-90% of the thickness of the metal. For example, if the material is 0.004 in. thick, as much as 0.0036 in. must be eroded during the etching process.

In addition, in order to accomplish reasonably efficient erosion of these corrosion resistant materials, the etchant agent chosen must be one tailored for the particular type of metal. Thus, a different acidic agent is required for each of the various metals. The specific material used to manufacture a particular rupture disc must be selected to meet the specifications of the application. Different disc applications require use of different types of metal. Therefore, when an etching process is used to form a line of weakness in corrosion resistant disc material, the manufacturer should have available an etchant agent that is most effective in eroding that specific corrosion resistant metal.

U.S. Patent Application Publication 2006/0237457 discloses forming a laser defined, electropolished line of weakness in a reverse acting rupture disc. A rupture disc blank is first pre-bulged, final bulged, and then provided with a layer of resist material. A laser is used to remove at least a portion of the layer of resist material corresponding to a desired line-of-weakness recess in the concave face of the bulged rupture disc. The disc is then subject to an electropolishing operation to remove metal from the lased area of the rupture disc, thereby forming a lustrous polished line-of-weakness recess in the disc. This technique produces acceptable results when used in connection with relatively thin, small-diameter discs. However, as the thickness and diameter of the disc increases, the electropolishing technique can become a less attractive means of forming the line-of-weakness recesses. Discs formed of thicker materials generally require longer electropolishing times in order to achieve a recess having the desired depth. The longer electropolishing times also result in an increase in the width of the recess. If the recess becomes too wide, the recess may begin to affect the burst pressure of the disc thereby resulting in a loss of control over the disc's opening characteristics.

SUMMARY OF THE INVENTION

In one embodiment of the present invention, there is provided a metallic, reverse acting rupture disc comprising a bulged portion having opposed concave and convex faces and a circumscribing flange area surrounding the bulged portion. The bulged portion generally includes at least one mechanically formed line-of-opening recess. The line-of-opening recess comprises a singular channel and has a depth that extends from one of the concave and convex faces inwardly toward the other of the concave and convex faces. The bulged portion of the rupture disc adjacent the channel has a substantially uniform metallic grain structure.

In another embodiment of the present invention, there is provided a metallic, reverse acting rupture disc comprising a bulged portion having opposed concave and convex faces and a circumscribing flange area surrounding the bulged portion. The bulged portion further comprises an opening area having at least one mechanically formed line-of-opening recess. The opening area generally has a substantially uniform metallic grain structure throughout. The line-of-opening recess comprises an elongated channel defined by a pair of spaced edges intersecting one of the concave and convex faces, and side margins continuously sloping away from the edges toward a single, deepest point of the channel. The line-of-opening recess is created by mechanically removing metal from the opening area without disrupting the substantially uniform metallic grain structure of the remaining portion of the opening area.

In yet another embodiment of the present invention, there is provided a method of forming a line-of-opening recess in a metallic pressure relief device. The method generally comprises providing a pressure relief precursor having a pressure relief portion configured to rupture and open upon exposure to a predetermined overpressure condition and a circumscribing flange area surrounding the pressure relief portion. The pressure relief portion has an opening area in which the line-of-opening recess is formed. The opening area has a substantially uniform metallic grain structure throughout. Next, the method comprises mechanically removing a portion of metal from the opening area so as to form the line-of-opening recess. The portion of metal is removed without disrupting the substantially uniform metallic grain structure of the remaining metal of the opening area.

DETAILED DESCRIPTION OF THE PREFERRED EMBODIMENT

Figure 25:
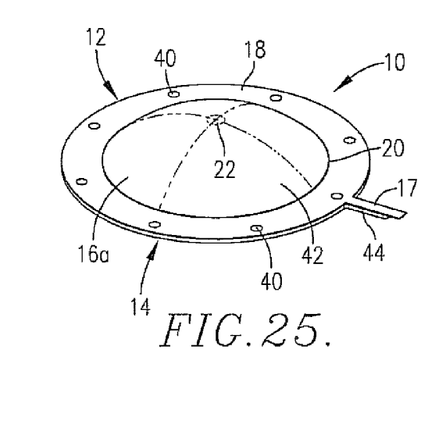
FIG. 25 is a perspective view of a reverse buckling rupture disc assembly in accordance with this invention.

A reverse buckling rupture disc assembly 10 embodying preferred concepts of this invention is illustrated in FIG. 25 of the drawings. Disc assembly 10 includes a rupture disc 12 and a support ring 14 secured thereto. The components of rupture disc assembly 10 are preferably fabricated of corrosion resistant metal material such as any one of a number of conventional corrosion-resistant metals such as stainless steel alloys, Hastalloy-C, MONEL, INCONEL, and nickel. Rupture disc 12 has a central bulged section 16, and an annular flange portion 18 that circumscribes bulged section 16. A transition zone 20 joins the inner periphery of flange portion 18 to the outer circular margin of bulged section 16.

Figure 23:
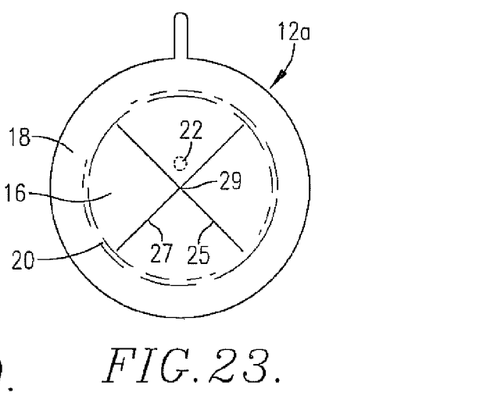
FIG. 23 is a plan view of another embodiment of a rupture disc according to the present invention having a machined cross-patterned line-of-opening recesses in the bulged portion thereof.

The bulged section 16 of rupture disc 12 has a relatively small region 22 which is centrally located on bulged section 16 and particularly centered at the apex of bulged section 16. However, it is within the scope of the present invention for region 22 to be offset from the central axis of bulged section 16, for example as shown in FIG. 23. The metal of region 22 has an altered grain structure and exhibits higher tensile strength than the remainder of bulged section 16, and has been formed by indenting the convex surface 16a, and then returning the indentation to its initial position so that the convex surface 16a of bulged section 16 is smooth without any significant interruptions. It is understood that it is within the scope of the present invention for bulged section 16 to be provided without this region of altered grain structure depending upon the particular application for which the disc is designed.

Figure 27:
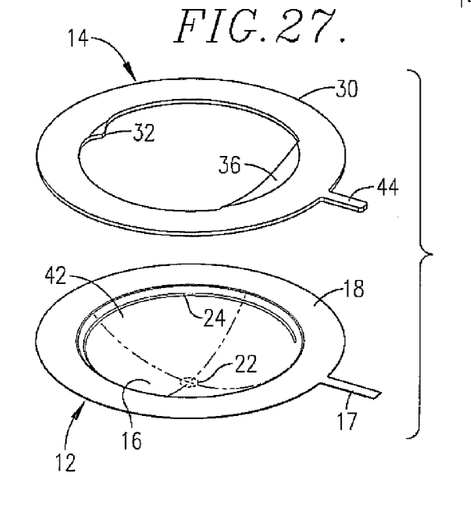
FIG. 27 is an exploded, bottom perspective view of the components making up the reverse buckling rupture disc assembly of FIG. 26 with the line of opening clearly visible.

The bulged section 16 of rupture disc 12 is provided with a semi-circular line-of-opening recess 24 that is in the bulged section 16 of the disc inboard of and generally complemental with transition zone 20, as is illustrated in FIG. 27.

Figure 26:
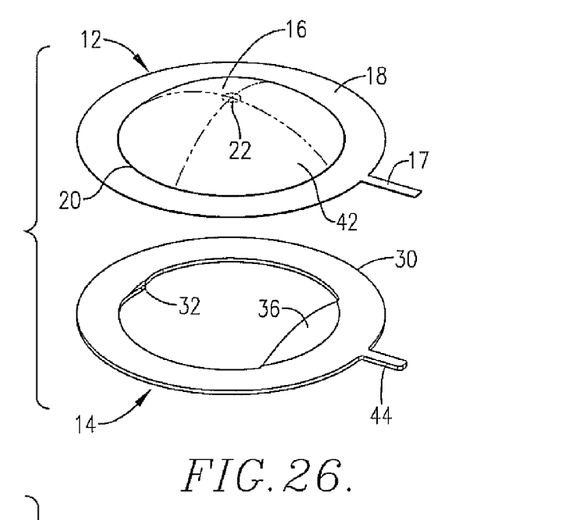
FIG. 26 is an exploded view of the components making up the reverse buckling rupture disc assembly.

The backup ring 14 has a main annular body 30 configured to underlie the flange portion 18 of rupture disc 12. It is to be seen from FIG. 26 that the inner edge of annular body 30 presents a tooth 32 projecting inwardly and slightly upwardly toward bulged section 16. A tongue 36 is integral formed with body 30, and extends inwardly and upwardly toward bulged section 16.

In its assembled condition, the annular body of support ring 30 is secured to the flange 18 of disc 12 by fasteners 40 which may comprise screws, tack welds, adhesive or other equivalent fastening means. The tongue 36 of backup ring 14 is preferably positioned between terminal ends 26 and 28 of line-of-opening recess 24 and acts as a backup for the hinge area 42 of bulged section 16 of rupture disc 12 defined by line-of-opening recess 24. The tip of tooth 32 is configured to directly underlie line-of-opening recess 24 and to contact recess 24 thereby assisting in the opening of bulged section 16 upon reversal of disc 12. An annular gasket (not shown) may be provided in association with the flange portion and support ring of the disc assembly.

Figure 1:
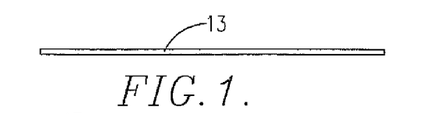
FIG. 1 is a schematic representation of a length of sheet metal material used for production of reverse acting rupture discs in accordance with the present invention.

The rupture disc 12 is fabricated from a sheet 13 of corrosion-resistant material (FIG. 1) as previously described, that may be unrolled from a large roll of the selected metal or supplied as sheet stock. A disc blank 15 is stamped, laser cut, or cut using electrical discharge machining (EDM) from the sheet 13. Preferably, the disc blank 15 has a peripheral unitary alignment tang 17. Fabrication of the rupture disc 12 is preferably accomplished in two stages. The first stage involves pre-bulging of the disc in a manner to form an indentation in the convex surface of a disc blank 15. The second stage involves final bulging of the disc under conditions such that the indentation in the convex surface of the bulged section of the disc is removed by returning the indented segment region of the bulged section to its initial position.

Figure 4:
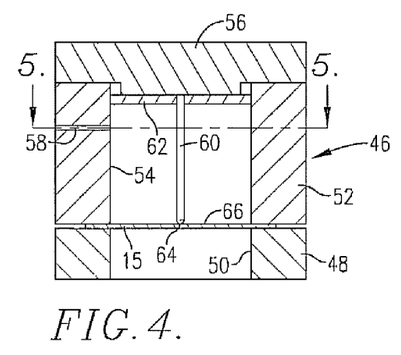
FIG. 4 is a schematic cross-sectional representation of apparatus for pre-bulging a rupture disc blank that includes a deflection post for forming an indentation in one surface of the blank.

A fixture 46 for forming an indentation of predetermined configuration in the metal rupture disc blank is schematically illustrated in FIG. 4. It is to be understood in this respect that the schematic depiction of fixture 46 is for illustrative purposes only and not intended to be representative of a particular type of fixture for accomplishing the intended result. The lower base ring 48 of fixture 46, which in its preferred form is of cylindrical configuration, has a central opening 50. The cylindrical clamping ring 52 of fixture 46 has a central passage 54 aligned with and has the same shape and cross-sectional area as opening 50. Cover member 56 closes the opened upper end of passage 54 of clamping ring 52. An opening 58 through the side wall of clamping ring 52 serves to allow gas such as air to escape from the interior of clamping ring 52. Although not illustrated, it is to be understood that the base ring 48 and/or the clamping ring 52 have a groove(s) for complementally receiving the tang 17 of a respective disc blank 15, so that the blanks 15 are all repetitively located in the fixture 46 in the same position.

Figures 5, 7, 8:
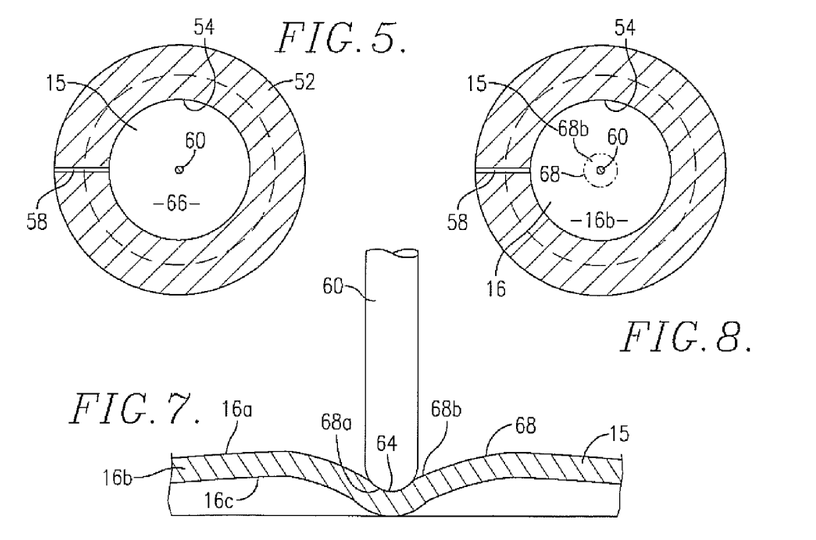
FIG. 5 is a horizontal cross-sectional view taken substantially on the line 5-5 of FIG. 4 and looking downwardly in the direction of the arrows.
FIG. 7 is an enlarged fragmentary schematic representation of the pre-bulged disc having an indented segment region in the partially bulged convex surface of the disc blank produced by the deflection post and which was formed by the deflection post.
FIG. 8 is a horizontal cross-sectional view taken on the line 8-8 of FIG. 6 and looking downwardly in the direction of the arrows.

An elongated deflection post 60 is positioned within passage 54 and preferably is coupled to a support element 62 laying against the under face of cover 56. After placement of metal disc blank 15 on support base ring 48, the disc 15 is clamped in place by ring 52 and base ring 48 positioned as shown in closing relationship to passage 54. Although in a preferred embodiment the outermost extremity of post 60 is hemispherical as shown in FIG. 5, the terminal end of post 60 may be square, cross-sectionally star-shaped, or any other desired configuration. The post 60 is of a length such that the terminal end 64 rests against the surface 66 of disc blank 15.

Figure 6:
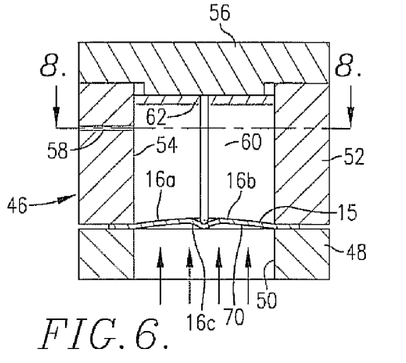
FIG. 6 is a schematic cross-sectional representation of the pre-bulging step using the fixture illustrated in FIG. 4 and which results in a segment region of a rupture disc blank being deflected from the main body of the blank.

Air under a pre-bulging pressure is introduced into fixture 46 via central opening 50 to effect pre-bulging of the disc blank 15, which causes the segment region 68 of disc 15 to be deflected from the main body of pre-bulged section 16b in a downward direction as shown in FIG. 6. The depth of the indented segment region 68, and the configuration and extent of such indentation is a function of the diameter of post 60, the shape and radius of the hemispherical end 64 of post 60 and the pressure applied to the surface 70 of disc blank 15. In the case of a post 60 having a hemispherical end 64, the indented segment region 68 has a generally hemispherical portion 68a and a tapered somewhat conical surface 68b leading to and terminating in the main body portion 16b of bulged section 16. Viewing FIG. 7, it can be seen that the central generally hemispherical indented segment region 68a is surrounded by a generally circular or oval shaped indented portion 68b radiating outwardly from the indented segment region 68a. During application of pressure to disc blank 15 to pre-bulge the disc blank, air within the cavity defined by passage 54 and cover 56 may escape from passage 54 via opening 58 in clamping ring 52.

Figure 9:
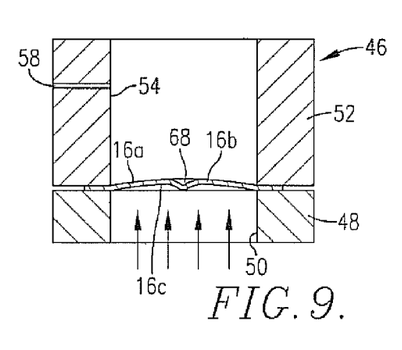
FIG. 9 is a schematic cross-sectional representation of the fixture as shown in FIG. 4 and illustrating the manner in which pressure is applied to the concave face of the pre-bulged rupture disc to effect final bulging of the rupture disc.
Figure 10:
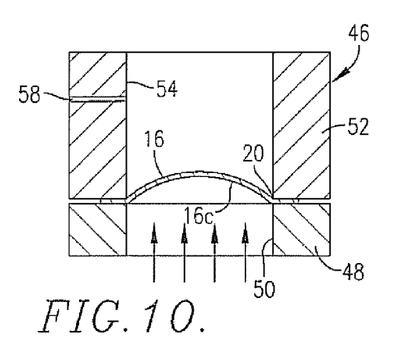
FIG. 10 is a schematic cross-sectional representation of the fixture as shown in FIG. 6 with the post removed and illustrating the manner in which sufficient pressure is applied to the concave face of the pre-bulged rupture disc to effect final bulging of the rupture disc and effect return of the previously indented segment region of the bulged section to its initial position before formation of the indentation therein during pre-bulging of the central section of the disc.
Figure 11:
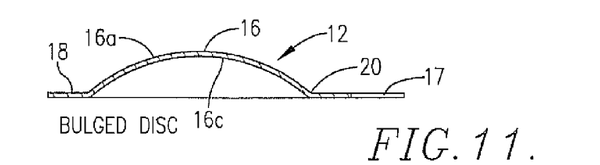
FIG. 11 is a schematic cross-sectional view of the final bulged disc in which the initial indentation in the central section of the disc has been ironed out during final bulging of the disc blank.
Figure 12:
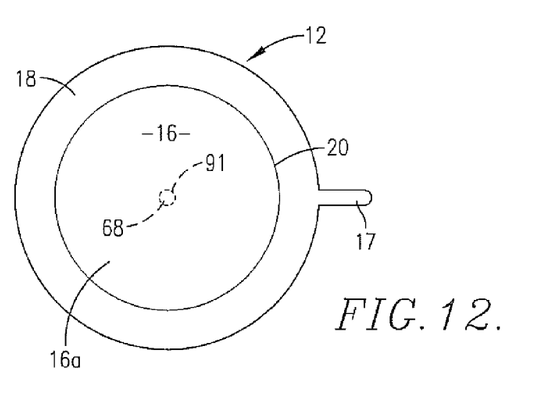
FIG. 12 is a plan view of the bulged disc as shown in FIG. 11, with the ironed out, initially indented segment of the disc being depicted by the circular dashed lines.
Figure 13:
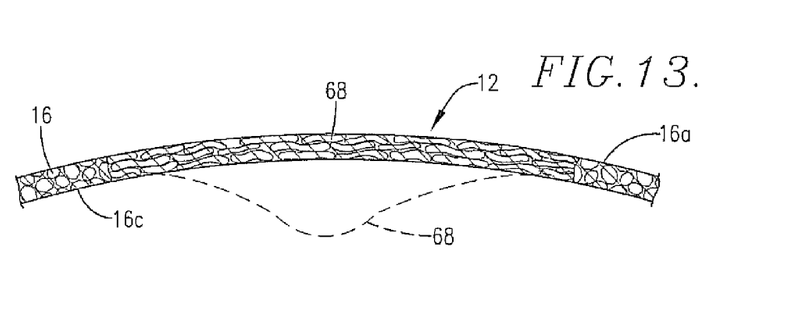
FIG. 13 is an enlarged cross-sectional representation of the portion of the bulged section of the rupture disc and which schematically illustrates the altered grain structure of the initially indented segment region of the bulged section of the disc that has been returned to its original position, as compared with the metal of the remaining portion of the bulged section.

Upon completion of the pre-bulging step, the cover 56 and associated deflection post 60 are removed from clamping ring 52. Pressure is applied to the concave face 16c of disc blank 15 sufficient to complete final bulging of the bulged section 16 of rupture disc 12 is depicted in FIG. 9. The amount of pressure applied during final bulging of rupture disc 12 should be adequate to not only completely bulge disc 12 forming bulged section 16, but also sufficient to return indented segment region 68 to its initial position as shown in FIG. 10. Thus, as shown in FIGS. 11 and 12, the convex surface of 16a of bulged section 16 is smooth and uninterrupted throughout its entire area including segment region 68 defining region 22. Indentation of segment region 68 followed by return of such indentation to its initial position causes the metal of region 22 to have an altered grain structure, as schematically shown in FIG. 13.

It has been found that by forming an indentation 68 in the disc blank 15 during pre-bulging of the disc, in which deformation of the metal occurs plastically in one direction, and then plastic deformation of the metal occurs in the opposite direction during final bulging of the disc blank 15, thereby returning the metal to its original position with the opposed concave and convex surfaces of the area 68 being complemental with the curvature of the opposed concave and convex faces of the bulged section 16, reversal of the bulged section at a predetermined and preselected pressure is initiated in the area 68. This initiation of reversal at the strategic position of the area 68 is attributable to the double prestressed condition of the area 68, and not as a result of geometry of the bulged section 16. Because the grain structure of the metal in the area 68 has been altered as a result of the deflection of that area in one direction, and then deflection of that very same area in an opposite direction, the resulting changes in the grain structure of the metal causes the area 68 to commence reversal before the remainder of the surface area of the bulged section 16. The more reliable reversal and full opening of the bulged section 16 along the line-of-opening recess 24 is obtained by the stressing of the metal in two directions in the area 68.

The support ring 14 is affixed to flange 18 of bulged rupture disc 12 using suitable fasteners and supporting the bulged section 16. Tongue 36 is substantially aligned with the hinge area 42 of bulged section 16, and the tang 17 of rupture disc 12.

The rupture disc assembly 10 is adapted to be mounted between flanged couplings of the type illustrated in FIGS. 6-9 U.S. Pat. No. 6,318,576 with the convex surface 16a of rupture disc 12 facing toward the process side of the equipment to be protected. Arm 44 on ring 30 provides the installer of the disc assembly 10 with information as to proper orientation of the assembly between the flange couplings during installation to insure that the convex surface 16a of rupture disc 12 faces toward the process side of the equipment. The arm 44 is also a continuing visual indicator that an installed disc in is proper orientation.

In the event an overpressure condition occurs in the process vessel or piping protected by rupture disc assembly 10, which is sufficient to effect reversal of the bulged section 16, bulged section 16 opens along the line-of-opening recess 24 while being retained by hinge portion 42. The reverse rupture commences at segment 68 defining region 22 because of the more highly stressed, altered grain structure of the segment region 68. Because of the existence of the higher stressed region 22 in bulged section 16, the overpressure exerted on the convex face 16a of bulged section 16 is believed to initiate reversal of bulged section 16 and ultimately to effect opening of bulged section 16 along the length of line-of-opening recess 24.

It has been unexpectedly discovered that by deflecting a segment of what will become the bulged section 16 of the disc as described in detail above, and then returning that segment to its initial position to present a smooth, uninterrupted convex surface, reversal of the disc is a function of discontinuity of the grain structure in the segment region 68. This is to be contrasted with simply providing a depression in the disc as illustrated and described in U.S. Pat. No. 6,494,074, in which rupture is initiated as the result of altered load geometry and subsequent stress distribution of the modified convex surface.

An exemplary disc 12 prepared in accordance with the preferred process of this invention and depicted in FIG. 10 is preferably fabricated from 16 mil 316 stainless steel and has an overall diameter of about 6 inches. Pre-bulging of the disc 12 as schematically illustrated in FIG. 6 is accomplished under a pressure of about 80 psig to form a depression 68 in the disc blank 44 as shown in FIG. 6. Final bulging of the disc as schematically shown in FIGS. 9 and 10 is carried out under a pressure of about 550 psig producing a bulged disc in which the height of the dome is about 1.125 inches. The final bulged disc is then subject to heat treatment at a temperature of about 600° F. for 10 minutes to further relieve any residual stresses in the disc. The outer boundary 91 (FIG. 12) of the metal segment region 68 of the bulged section of the disc, which has been subjected to greater stress than the remaining metal of the bulged section 16 has a nominal area of about 1.07 square inches. The segment region 68 in the exemplary disc of FIG. 12 is centrally located in bulged section 16. This disc has a nominal burst pressure of about 150 psig.

It has been unexpectedly discovered that by varying the pressure applied to the disc blank 15 in the fixture 46 to effect pre-bulging of the disc against the post 60, the reversal pressure of the final bulged disc, where the area 68 of bulged section 16 has been indented in one direction and then ironed out in the opposite direction, the pressure at which the disc reverses can similarly be varied. By increasing the pre-bulging pressure to deepen the initial indentation in the bulged section of the disc, followed by ironing out of that indentation during final bulging of the disc, it has been found that the rupture disc will reverse at a lower pressure. Accordingly, the range of reversal pressures that can be achieved using a particular thickness of material is broader than a disc having a one direction indentation not subsequently ironed out because of the bidirectional two stage work hardening of the metal as compared with single direction deflection of the material. This increased range of predictable reversal pressures is deemed in large measure to be attributable to the effect of additive opposite direction stress hardening of the metal and the concomitant substantial change in grain structure. In the case of a permanent one direction indentation in the metal, reversal of the disc is believed to be primarily dependent on force vector geometry. Thus, by pre-bulging the disc at different pressures to obtain different depths of initial indentations in the bulged section of the disc blank, followed by final bulging of the disc to an extent to iron out the indentation, the reversal pressures of the resulting discs can be empirically established and the results noted for subsequent duplication. These empirical analyses are a function of the type of material used to manufacture the rupture disc, the thickness of that material, and the diameter of the disc.

Figure 14:
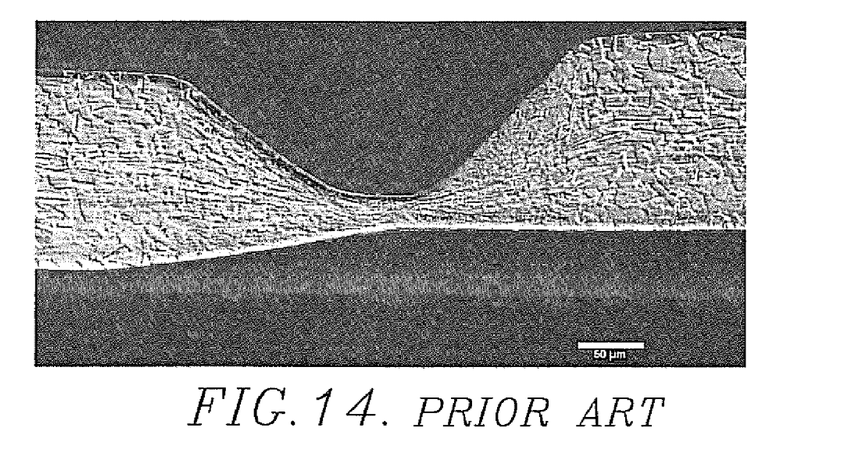
FIG. 14 is a cross-sectional photograph of a line-of-weakness recess formed in a pressure relief device using a prior art scoring technique.

As previously noted, it has long been known to provide a line-of-weakness recess or a score line in one face of the bulged portion of a reverse acting rupture disc in order to define the area of the disc that opens upon reversal. One of the most common previously employed techniques for creating lines of weakness has been to employ a metal scoring die. FIG. 14 is a cross-sectional photograph of a rupture disc containing a line of weakness formed using a scoring die. During the scoring process, a portion of the metallic grains making up the bulged section of the disc are compressed, disturbed, or shifted thereby forming an elongated channel or trough. As a result, the once-uniform grain structure of the portion of the bulged section wherein the score line is now situated has been disrupted. This disrupted metallic grain structure is plainly visible in FIG. 14.

The metallic grains lying within a yet-to-be defined opening area have been compressed and elongated. Thus, the metallic grains within the opening area are no longer uniform throughout. The disruption of the metallic grain structure results in work-hardening of the metal and leads to increased brittleness of the metal and the creation of stress zones. The increased brittleness and stress zones of the metal limit the service life of the rupture disc as a result of fatigue cracking and stress corrosion. Discs produced with die scored lines of weakness generally exhibit decreased cycle life, that is the ability of the disc to avoid failure upon exposure to multiple successive pressure cycles. Many such discs are only able to withstand 500 or less cycles (one cycle being defined as the successive exposure to vacuum followed by exposure to 90% of the rated operating ratio).

Figure 15:
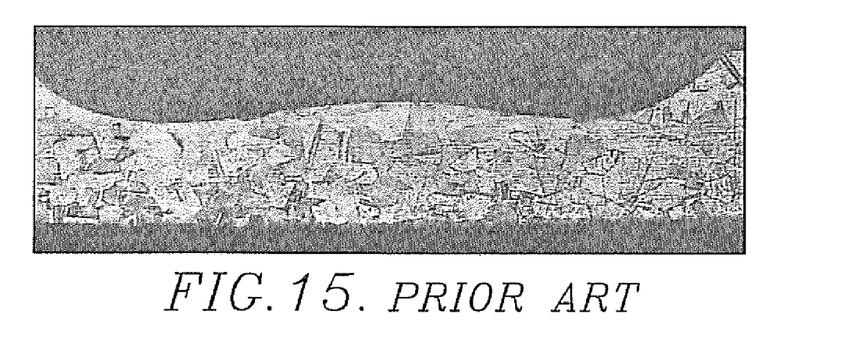
FIG. 15 is a cross-sectional photograph of a line-of-weakness recess formed in a pressure relief device using a prior art electropolishing method.

Another technique has been devised to create a line-of-weakness recess in the bulged portion of reverse acting rupture discs that would not alter or disrupt the metallic grain structure within the opening area so as to avoid the undesirable characteristics attendant with die scoring. This technique is described in U.S. Patent Application Publication 2006/0237457 (application Ser. No. 11/096,466), hereby incorporated by reference in its entirely. The '457 publication describes a method wherein a layer of resist material is applied to a final bulged rupture disc. A laser is used to remove a portion of the resist material corresponding to a desired line-of-opening recess. The disc is then subject to an electropolishing operation to remove metal from the lased area of the rupture disc. FIG. 15 is a cross-sectional photograph of a disc manufactured according to this method.

As shown in FIG. 15, a line-of-opening recess is formed that comprises two, spaced-apart channel portions separated by a central raised crown portion thereby presenting a generally W-shaped cross section. As can be seen, the metallic grain structure within the opening area has not been disrupted as in the die scored disc of FIG. 14. As a result, creation of stress zones due to work hardening of the metal is avoided and the electropolished disc exhibits a much improved cycle life compared to the die scored disc of FIG. 14.

However, it has been discovered that the electropolishing technique described in the '457 publication has certain limitations particularly when used in connection with larger disc diameters and thicknesses. In order to effectively and reliably accomplish opening of the disc upon reversal thereof, it has been discovered that the line-of-opening recess should present a depth that is at least 40% of the dome thickness of the disc, in certain embodiments between about 40% to about 75% of the dome thickness of the disc, and in additional embodiments between about 45% to about 60% of the dome thickness of the disc. As used herein, the term "dome thickness of the disc" is defined as the measured material thickness of the disc dome in the region in which the line-of-opening recess is formed.

Discs formed from thicker blanks, for example, at least 0.008 inch, require much longer periods of electropolishing in order to achieve the desired line-of-opening recess depth. Consequently, the width of the line-of-opening recess also increases. Table 1 below illustrates this phenomenon for a disc fabricated from 316 stainless steel blanks having a thickness of 0.016 in and presenting a dome diameter of 4 inches.

TABLE 1

| Average recess depth (% of dome thickness) | Average recess width (in.) |
| --- | --- |
| 35.2% | 0.060 |
| 40.5% | 0.062 |
| 50.8% | 0.073 |
| 60.5% | 0.080 |

It was discovered that as the recess width increases the performance of the disc is adversely affected. As the recess width increases, the line-of-opening recess begins to control the burst pressure of the disc, rather than, for example, segment region 68. Thus, reversal of the disc will tend to prematurely initiate at the line-of-opening recess. This leads to less predictable opening characteristics of the disc, such as reversal of the disc at pressures well below the rated burst pressure and undesirable burst pressure fluctuations.

Figure 30:
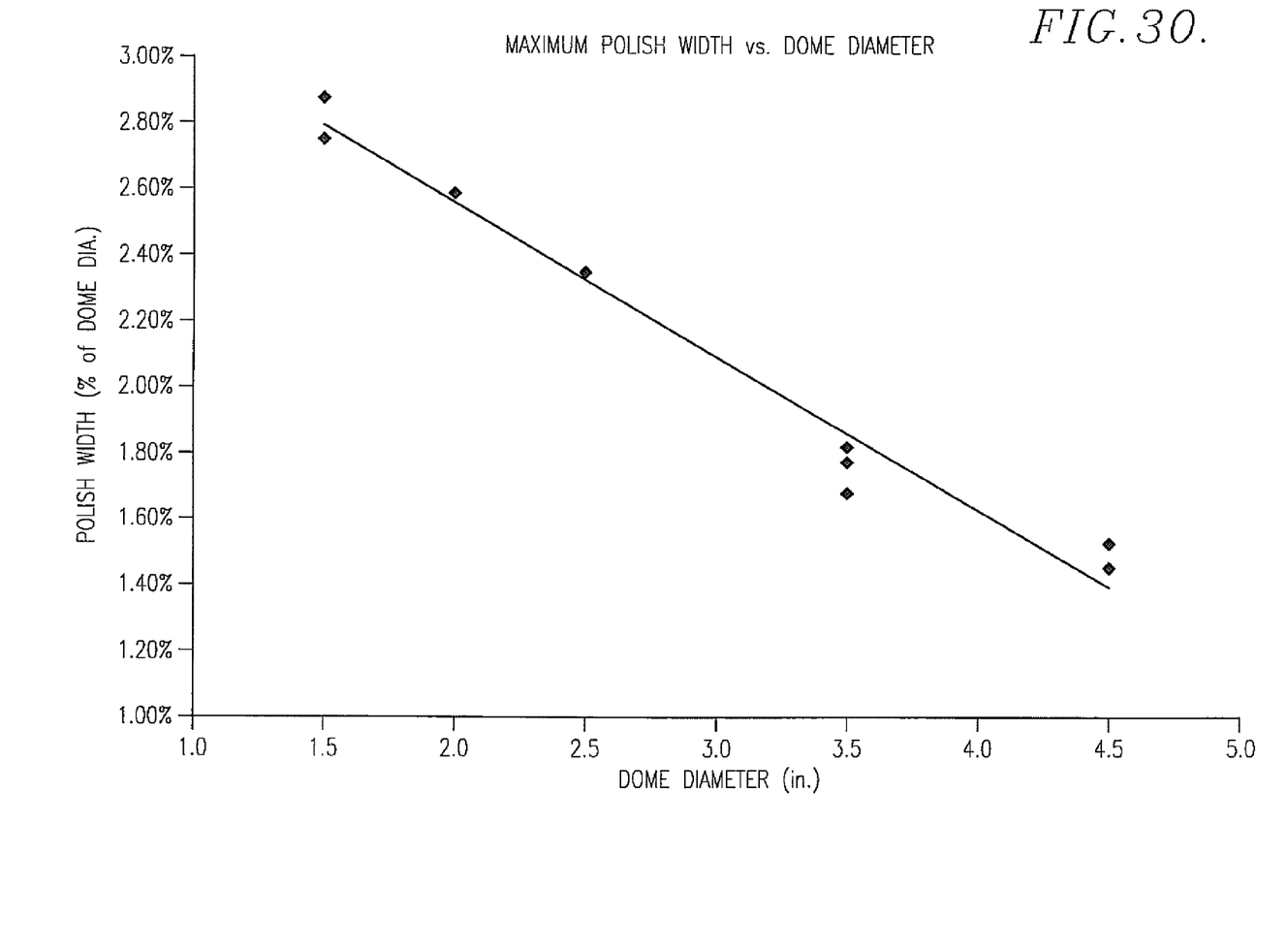
FIG. 30 is a graphical representation demonstrating the maximum polish width of a line of weakness that may be formed using a prior art electropolishing technique without adversely affecting the burst characteristics of a reverse acting rupture disc versus the diameter of the dome or bulged portion of the disc.

FIG. 30 is a chart illustrating some of the practical limits of forming the line-of-opening recess in various discs using the electropolishing technique. In this figure, the relationship between the dome diameter of the disc and the maximum width of a line-of-opening recess (expressed as a percentage of the dome diameter) is shown. The data, which fits a linear trend line, identifies points at which the ability to maintain satisfactory control over the disc burst pressure is lost when forming the line-of-opening recess using the electropolishing technique. Loss of control over burst pressure is identified when the disc having a line-of-opening recess bursts at a pressure that is at least 5% less than that of a disc including only segment 68 and no line-of-opening recess. Control over the burst pressure of discs having smaller dome diameters can be maintained with recess widths that are a higher percentage of the disc's dome diameter than compared to discs with larger dome diameters. However, it is generally the case that as dome diameter increases, so does the thickness of the disc material. Consequently, such larger discs require longer periods of electropolishing to achieve the required recess depth which also tends to increase the width of the recess. Therefore, the electropolishing technique is generally not acceptable for use on thicker, larger-diameter discs.

The present invention overcomes the problems associated with die scoring discussed herein because the grain structure is not altered. It is noted that the recess formed in accordance with the present invention is referred to as a "line-of-opening" recess as opposed to a "line-of-weakness" recess. The present invention allows for increased cycle life as mentioned herein which is generally not the case with discs having line-of-weakness recesses formed by die scoring.

Figure 17:
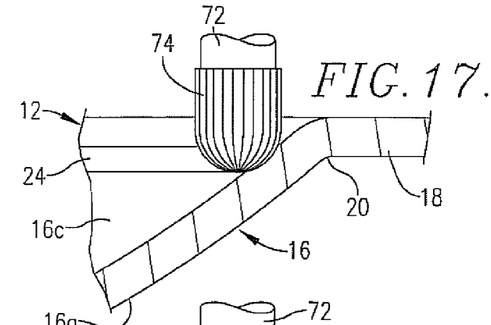
FIG. 17 is a fragmentary cross-sectional view illustrating a first pass of a mechanical mill during formation of a line-of-opening recess in the bulged portion of a reverse acting rupture disc in accordance with the present invention.
Figure 18:
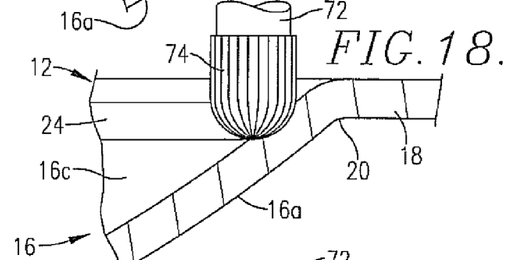
FIG. 18 is a fragmentary cross-sectional view illustrating a second pass of a mechanical mill during formation of a line-of-opening recess in the bulged portion of a reverse acting rupture disc in accordance with the present invention.
Figure 19:
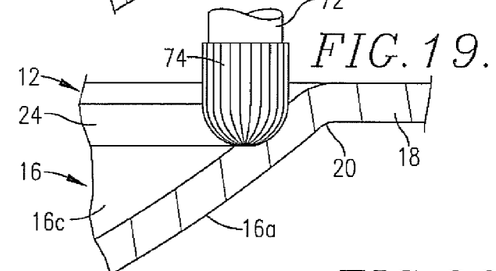
FIG. 19 is a fragmentary cross-sectional view illustrating a third pass of a mechanical mill during formation of a line-of-opening recess in the bulged portion of a reverse acting rupture disc in accordance with the present invention.

FIGS. 17-19 illustrate a method of creating a line-of-opening recess in a reverse acting rupture disc in accordance with an embodiment of the present invention. Turning first to FIG. 17, rupture disc 12 is shown in fragmentary cross-sectional view. A mill 72 having a milling end 74 is shown making an initial pass across the concave face 16c and forming line-of-opening recess 24. As shown, milling end 74 presents a hemispherical shape, however, it is within the scope of the present invention for milling end 74 to present alternate configurations such as conical, cylindrical, or spherical (ball-shaped) depending upon the desired geometry of the line-of-opening recess. In certain embodiments according to the present invention, it is preferred that a ball-shaped mill or the illustrated hemispherical mill be used so that line-of-opening recess 24 presents a smooth, arcuate configuration without the presence of sharp edges or corners. Milling end 74 may be made of any material sufficient to cut the metal from which disc 12 is fabricated. In certain embodiments, milling end 74 may comprise diamond, carbide, or a metal alloy that is harder than the disc metal.

The particular mill operating parameters for forming the line-of-opening recess 24 depend upon several variables: the diameter of the mill end, the mill speed, and the mill feed rate. The mill speed is defined as the rotational speed of the mill and the mill feed rate is the speed at which the mill moves along the surface being cut. In certain embodiments of the present invention, the mill employed has a diameter of between about 0.020 to about 0.060 inch. Also, in certain embodiments of the present invention, the mill operates with a mill speed of at least 10,000 RPM, and in other embodiments in the range of about 10,000 to about 40,000 RPM. In still other embodiments of the present invention, the mill to operates at a feed rate of at least 10 in/min, and in yet further embodiments between about 10 to about 60 in/min.

After the first pass is completed, the mill 72 may conduct a plurality of additional passes, each serving to further increase the depth of line-of-opening recess 24. FIG. 18 depicts a second pass of milling end 74 across convex face 16c in which the depth and width of recess 24 has been increased. FIG. 19 depicts yet another pass of milling end 74 wherein the depth and width of recess 24 has again been increased. The number of passes made by the mill 72 will depend on several factors including the hardness of the material from which the disc is formed, the milling end material and the desired depth of the line-of-opening recess. As explained below, each respective pass is made without disturbing the substantially uniform metallic grain structure of the metal left behind.

Figure 16:
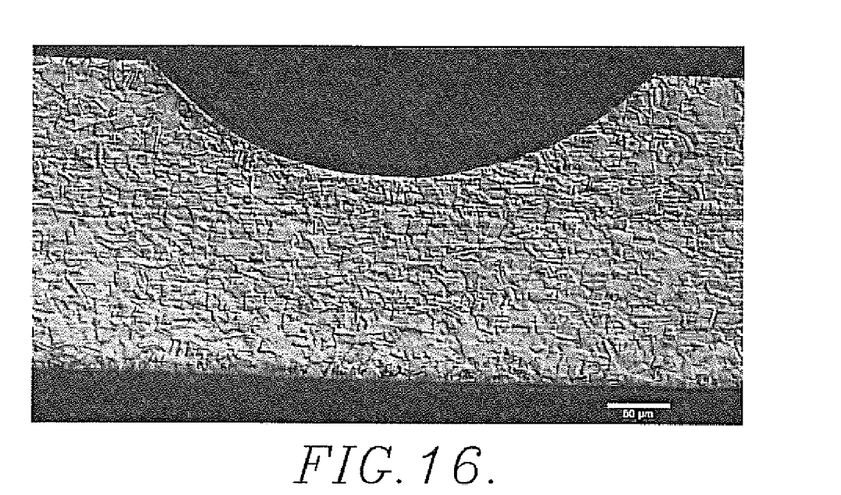
FIG. 16 is a cross-sectional photograph of a line-of-opening recess created in a pressure relief device in accordance with the present invention.

FIG. 16 is a cross-sectional photograph of a rupture disc with a line-of-opening recess formed therein. It is clear that the metallic grain structure of the disc metal remaining after the recess is formed remains substantially uniform. The remaining metal does not exhibit signs of work hardening as is the case with the disc containing the die scored line-of-weakness recess in FIG. 14. Particularly, the portion of the disc containing the line-of-opening recess, hereafter described as an area of opening 76 (see, FIG. 20), exhibits a substantially uniform metallic grain structure. Further, the metallic grain structure of the area of opening remains substantially in its intrinsic state, that is, the grain structure prior to any milling operation. The lack of work hardening allows discs made according to the present invention to exhibit excellent cycle life of greater than 10,000 cycles without failure.

Figure 2:
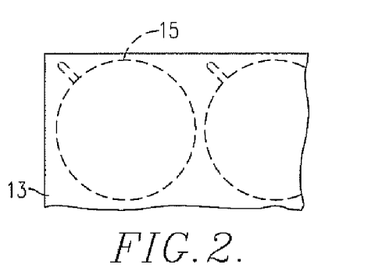
FIG. 2 is a fragmentary plan view of the metal sheet of FIG. 1 and showing in dashed lines the outline of rupture disc blanks to be formed from the metal sheet material of FIG. 1.
Figure 3:
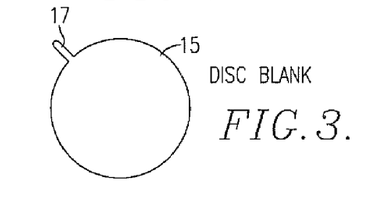
FIG. 3 is a schematic plan view of a disc blank formed from the sheet material of FIG. 2.

Further, the above-described method is not limited to being performed only on reverse acting rupture discs. This method may be employed during fabrication of any pressure relief device or precursor. For example, the line-of-opening recess may be created in disc blank 15 (FIGS. 2 and 3), a pre-bulged disc 15 such as shown in FIGS. 6 and 8, and forward acting rupture discs. However, in each instance the line-of-opening recess is formed in the yet-to-be described area of opening 76 of the pressure relief device or precursor.

Figure 20:
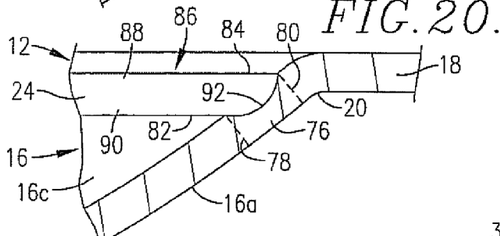
FIG. 20 is a fragmentary cross-sectional view of a reverse acting rupture disc having a line-of-opening recess formed in the concave face of the bulged portion of the disc, the line-of-opening recess being substantially U-shaped in cross section.

Turning now to FIG. 20, a metallic, reverse acting rupture disc 12 is shown comprising a bulged portion 16 presenting opposed convex and concave faces, 16a and 16c, respectively. The line-of-opening recess 24 is formed in concave face 16c of the bulged portion 16, and particularly in a section of bulged portion 16 referred to as the area of opening 76. The area of opening 76 is defined by a pair of margins 78, 80 extending from opposed edges of the line-of-opening recess 82, 84 through the disc material to convex face 16a. Thus, margins 78, 80 intersect faces 16a, 16c in a substantially perpendicular manner. Edges 82, 84 are formed by the intersection of concave face 16c and recess 24 and generally define the maximum width of recess 24.

Figure 24:
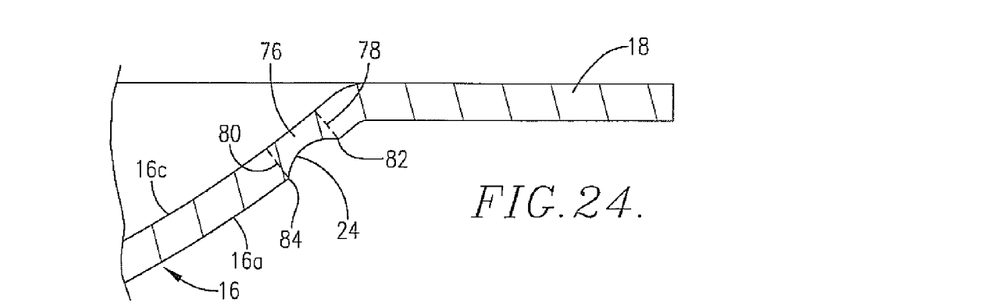
FIG. 24 is a fragmentary cross-sectional view of an embodiment of a rupture disc according to the present invention having a machined line-of-opening recess formed in the convex face of the bulged portion of the disc.

It is also within the scope of the present invention for the line-of-opening recess 24 to be formed in the convex face 16a of bulged portion 16 as illustrated in FIG. 24. In that particular embodiment, opening area 76 is defined in essentially the same manner as described above. However, edges 82, 84 are formed by the intersection of convex face 16a and recess 24.

Figure 21:
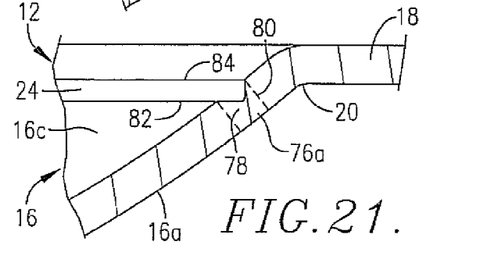
FIG. 21 is a fragmentary cross-sectional view of a reverse acting rupture disc having a line-of-opening recess formed in the concave face of the bulged portion of the disc, the line-of-opening recess being substantially V-shaped in cross section.

Line-of-opening recess 24 comprises a singular channel that presents a depth that extends from either of concave face 16c or convex face 16a inwardly toward the other of said faces. As used herein, the term "singular channel" is defined as a channel or trough formed in the disc that is bounded by side margins that smoothly and continuously slope away from the outer surface of the disc toward a central deepest point of the channel. The term "singular channel" is intended to expressly exclude the W-shaped recess shown in FIG. 15 and described in the '457 publication. Turning again to FIG. 20, recess 24 comprises an elongated channel 86 that is defined by edges 82, 84 that intersect concave face 16c (or convex face 16a in the embodiment of FIG. 24) and side margins 88, 90 that continuously slope away from edges 82, 84 toward a single, deepest point 92 of the channel. In certain embodiments according to the invention, channel 86 is substantially U-shaped in cross section as illustrated in FIG. 20, or substantially V-shaped in cross section as illustrated in FIG. 21. Although, in certain embodiments, it is desired to avoid the presence of sharp points or edges as this tends to create stress zones within bulged portion 16 that may affect the burst characteristics and cycle life of the disc.

In the embodiment depicted in FIG. 20, the channel 86 presents a continuous, arcuate, concave shape extending from edge 82 to edge 84. There are no raised, crown portions within channel 86 as appear in line-of-opening recesses made according to the electropolishing technique disclosed in the '547 publication.

Table 2 demonstrates the efficacy of the present invention in controlling the width of the line-of-opening recess while still achieving the required depth. These measurements were obtained by milling a line-of-opening recess in a 6 inch disc formed of 0.016 inch thick stainless steel 316 using a mill having a diameter of 0.031 inch.

TABLE 2

| Average recess depth (% of dome thickness) | Average recess width (in.) |
|---|---|
| 48.2% | 0.026 |
| 52.0% | 0.027 |
| 56.7% | 0.027 |
| 71.6% | 0.030 |

The data demonstrates that recesses having depths of 70% or more of the dome thickness can be achieved through mechanical milling with recess widths that are one-third of those recesses produced by electropolishing techniques.

The present invention is particularly well suited for use in the manufacture of metallic, reverse acting rupture discs having a nominal thickness of at least 0.008 inch. In certain embodiments, rupture discs made in accordance with the present invention present nominal thicknesses of at least 0.010 inch, or at least 0.016 inch. The term "nominal thickness" refers to the thickness of the metal sheet or blank from which the rupture disc is formed. Those of skill in the art can appreciate that bulging of the disc may cause the metal to thin in certain areas, particularly toward the apex region of the dome. However, the metal comprising the flange area and those portions of the dome adjacent the flange area will present substantially the same thickness as the metal sheet or disc blank.

In certain embodiments of the present invention, channel 86 presents a width of less than 0.060 inch and a depth of at least 0.004 inch. In other embodiments, channel 86 presents a width of less than 0.045 inch and a depth of at least 0.006 inch. In still further embodiments, channel 86 presents a width of less than 0.035 inch and a depth of at least 0.008 inch. The electropolishing technique is not capable of producing channels of such widths and depths. As noted above, in order to reach the desired depths, the width of the line-of-opening recess will extend beyond the recited width boundaries.

In still other embodiments according to the present invention, the bulged portion 16 of the rupture disc presents a diameter D and channel 86 presents a maximum width W. When D is 1.5 inches, W is no greater than 0.020 inch. When D is 12 inches, W is no greater than 0.060 inch. For all values of D between 1.5 and 12 inches, W varies substantially linearly between 0.020 and 0.060 inch. This characterization of D and W derived at least in part from FIG. 29, ensures that the control over disc burst pressure is maintained provided the aforementioned criteria are met.

The disc precursor, that is the disc as it exists immediately prior to formation of line-of-opening recess 24, presents an area of opening 76 comprising a substantially uniform metallic grain structure. When line-of-opening recess 24 is created by mechanically removing metal from area of opening 76, the substantially uniform metallic grain structure of the remaining metal of the area of opening has not been disrupted from its original, disc precursor state. As shown in FIG. 16, metal grains or portions thereof have simply been removed from the area of opening and no work hardening of the remaining metal has occurred.

Figure 22:
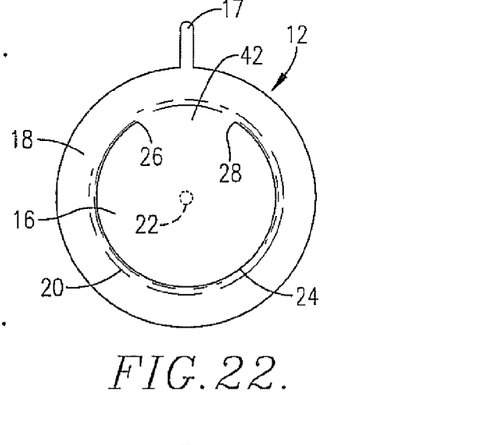
FIG. 22 is a plan view of another embodiment of a rupture disc according to the present invention having a machined line-of-opening recess in the bulged portion thereof wherein the line-of-opening recess presents a generally C-shaped configuration.

As shown in FIG. 22, line-of-opening recess 24 is generally C-shaped in configuration and terminates with end extremities 26 and 28 on opposite sides of the hinge portion 42. However, it is within the scope of the present invention for the line-of-opening recess to present alternate configurations such as those shown in FIGS. 23, 28, and 29.

Turning to FIG. 23, the C-shaped line-of-opening recess has been replaced with two intersecting line-of-opening recesses 25 and 27. Recesses 25 and 27 extend from proximate one portion of the transition region 20 across the apex of bulged portion 16 to the opposite portion of the transition region. Recesses 25 and 27 intersect at a central junction at or near the apex of bulged section 16. Thus, upon reversal and rupture of disc 12a, bulged section 16 breaks into four petals each hinged at a respective portion of the transition region 20.

As illustrated, the line-of-opening recesses 24, 25, and 27 are continuous, uninterrupted recesses. However, it is also within the scope of the present invention for these recesses to be discontinuous or broken up into a series of individual, spaced apart or "dashed" segments.

Figure 28:
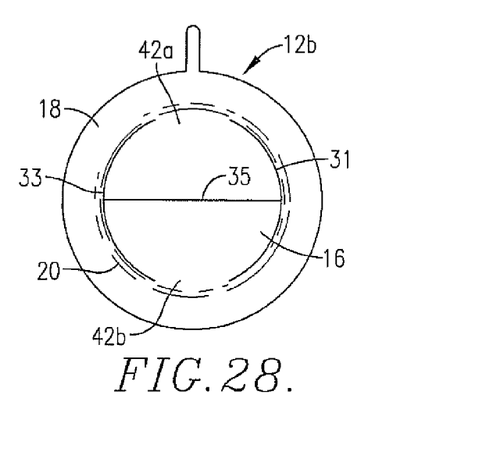
FIG. 28 is a plan view of another embodiment of a rupture disc according to the present invention having a machined line-of-opening recess in the bulged portion thereof wherein the line-of-opening recess is configured so that the disc presents a pair of hinge portions and upon rupture forms two petal sections.

In the embodiment shown in FIG. 28, the line-of-opening recess presents three joined segments: two arcuate segments 31 and 33 and one laterally extending segment 35 that connects segments 31 and 33. Laterally extending segment 35 also presents an arcuate shape from a side view perspective of disc 12b as it necessarily follows the contour of bulged section 16. Disc 12b includes two opposed hinge sections 42a and 42b each configured to retain a portion of bulged section 16 upon opening of the disc. Thus, this embodiment represents a "double hinge" configuration in which the disc forms two petal sections upon opening.

Figure 29:
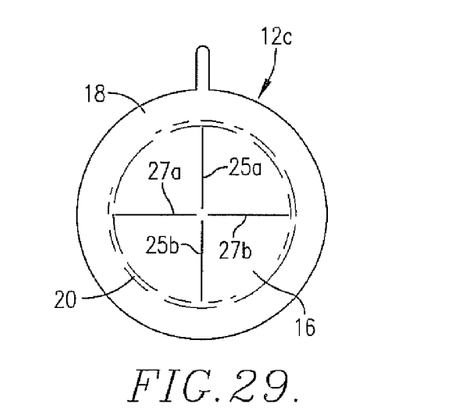
FIG. 29 is a plan view of yet another embodiment of a rupture disc according to the present invention having a machined cross-patterned line-of-opening recesses in the bulged portion thereof, wherein the recesses do not intersect.

FIG. 29 depicts a slight modification that may be made to the cross-line recess pattern of FIG. 23. Instead of a pair of continuous, intersecting recesses, the disc 12c has been provided with four discrete line-of-opening recesses 25a, 25b, 27a, and 27b that do not intersect. Disc 12c, however, is still configured to form four petals upon bursting.

In the embodiment depicted in FIG. 22, the line-of-opening recess 24 is disposed on bulged portion 16 at a location closer to the flange than to the apex of portion 16. Thus, tearing of the bulged portion 16 occurs at a location proximate to main annular support body 30 thereby affording ample support for hinge area 42 and preventing undesired fragmentation of disc 12. Note also that region 22 having altered grain structure is shown at the apex of bulged portion 16. However, region 22 may also be offset from the apex, as shown in FIG. 23. In any event, initiation of reversal of portion 16 occurs at region 22. Thus, the line-of-opening recess 24 (and consequently area of opening 76) is radially spaced apart from region 22 and located between region 22 and transition zone 20.

In certain embodiments according to the present invention, the surface finish of the line-of-opening recess 24 is greater than about 4 microinches of average deviation from the mean surface. In still other embodiments, the surface finish is greater than about 8 microinches of average deviation from the mean surface. Thus, the mechanically formed line-of-opening recess 24 is readily distinguishable from electropolished line-of-weakness recess by the naked eye. The line-of-weakness recess formed by the electropolishing technique exhibits greater luster than the line-of-opening recess formed by the present mechanical process.

The embodiments of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

We claim:

1. A metallic, reverse acting rupture disc comprising:
a bulged portion having opposed concave and convex faces; and a circumscribing flange area surrounding said bulged portion, said bulged portion including at least one line-of-opening recess formed by mechanically removing metal from said bulged portion, said at least one line-of-opening recess comprising a singular channel and having a depth that extends from one of said concave and convex faces inwardly toward the other of said concave and convex faces, said bulged portion of said rupture disc adjacent said channel having a substantially uniform metallic grain structure.

2. The rupture disc according to claim 1, wherein said channel is substantially U-shaped or substantially V-shaped in cross section.

3. The rupture disc according to claim 1, wherein said rupture disc has a nominal thickness of at least 0.008 inch.

4. The rupture disc according to claim 3, wherein said channel has a width of less than 0.060 inch and a depth of at least 0.004 inch.

5. The rupture disc according to claim 1, wherein said bulged portion of said disc has a diameter D and said channel has a maximum width W, when D is 1.5 inches, W is no greater than 0.020 inch;
when D is 12 inches, W is no greater than 0.060 inch; and
when D is between 1.5 inches and 12 inches, W varies substantially linearly between 0.020 and 0.060 inch.

6. The rupture disc according to claim 5, wherein said channel has a minimum depth of at least 40% of the dome thickness of the disc.

7. The rupture disc according to claim 1, wherein said at least one line-of-opening recess is created without disrupting the substantially uniform metallic grain structure of said bulged portion adjacent said channel.

8. The rupture disc according to claim 7, wherein said at least one line-of-opening recess is created by a mill having a mill diameter of between about 0.020 to about 0.060 inch operating at about 10,000 RPM or greater.

9. The rupture disc according to claim 1, wherein said at least one line-of-opening recess is generally C-shaped in configuration.

10. The rupture disc according to claim 9, wherein said bulged portion has an apex, said line-of-opening recess being disposed on said bulged portion at a location closer to said flange than to said apex.

11. The rupture disc according to claim 1, wherein said bulged portion comprises a plurality of line-of-opening recesses.

12. The rupture disc according to claim 11, wherein said bulged portion comprises at least two elongated line-of-opening recesses, said recesses configured so that upon opening said rupture disc includes a plurality of petal sections.

13. The rupture disc according to claim 12, wherein said at least two line-of-opening recesses intersect at or near the apex of said bulged portion.

14. The rupture disc according to claim 12, wherein said at least two line-of-opening recesses do not intersect.

15. The rupture disc according to claim 11, wherein said bulged portion comprises two arcuate line-of-opening recesses interconnected by a laterally extending recess, said arcuate line-of-opening recesses defining a pair of hinge sections located therebetween.

16. The rupture disc according to claim 1, wherein said bulged portion has an area of weakness at which reversal of said disc is initiated upon exposure to a predetermined overpressure condition, said area of weakness being spaced apart from said at least one line-of-opening recess.

17. The rupture disc according to claim 1, wherein said at least one line-of-opening recess is formed in the concave face of said bulged portion.

18. A metallic, reverse acting rupture disc comprising:

a bulged portion having opposed concave and convex faces and an opening area having at least one mechanically formed line-of-opening recess; and a circumscribing flange area surrounding said bulged portion, said opening area having a substantially uniform metallic grain structure throughout, said at least one line-of-opening recess comprising an elongated channel defined by a pair of spaced edges intersecting one of said concave and convex faces and side margins continuously sloping away from said edges toward a single, deepest point of said channel, said at least one line-of-opening recess being created by mechanically removing metal from said opening area without disrupting the substantially uniform metallic grain structure of the remaining portion of said opening area.

19. The rupture disc according to claim 18, wherein said channel is substantially U-shaped or substantially V-shaped in cross section.

20. The rupture disc according to claim 18, wherein said rupture disc has a nominal thickness of at least 0.008 inch.

21. The rupture disc according to claim 20, wherein said channel has a width of less than 0.060 inch and a depth of at least 0.004 inch.

22. The rupture disc according to claim 18, wherein said bulged portion of said disc has a diameter D and said channel has a maximum width W, when D is 1.5 inches, W is no greater than 0.020 inch;
when D is 12 inches, W is no greater than 0.060 inch; and
when D is between 1.5 inches and 12 inches, W varies substantially linearly between 0.020 and 0.060 inch.

23. The rupture disc according to claim 22, wherein said channel has a minimum depth of at least 40% of the dome thickness of the disc.

24. The rupture disc according to claim 18, wherein said at least one line-of-opening recess is created by a mill having a mill diameter of between about 0.020 to about 0.060 inch operating at about 10,000 RPM or greater.

25. The rupture disc according to claim 18, wherein said at least one line-of-opening recess is generally C-shaped in configuration.

26. The rupture disc according to claim 25, wherein said bulged portion has an apex, said at least one line-of-opening recess being disposed on said bulged portion at a location closer to said flange than to said apex.

27. The rupture disc according to claim 18, wherein said bulged portion comprises a plurality of line-of-opening recesses.

28. The rupture disc according to claim 27, wherein said bulged portion comprises at least two elongated line-of-opening recesses, said recesses configured so that upon opening said rupture disc includes a plurality of petal sections.

29. The rupture disc according to claim 28, wherein said at least two line-of-opening recesses intersect at or near the apex of said bulged portion.

30. The rupture disc according to claim 28, wherein said at least two line-of-opening recesses do not intersect.

31. The rupture disc according to claim 18, wherein said bulged portion comprises two arcuate line-of-opening recesses interconnected by a laterally extending recess, said arcuate line-of-opening recesses defining a pair of hinge sections located therebetween.

32. The rupture disc according to claim 18, wherein said bulged portion has an area of weakness at which reversal of said disc is initiated upon exposure to a predetermined overpressure condition, said area of weakness being spaced apart from said opening area and said at least one line-of-opening recess.

33. The rupture disc according to claim 18, wherein said at least one line-of-opening recess is formed in the concave face of said bulged portion.

34. A method of forming a line-of-opening recess in a metallic, pressure relief device comprising the steps of:
provuling a bulged rupture disc having a bulged pressure relief portion configured to rupture and open upon exposure to a predetermined overpressure condition and a circumscribing flange area surrounding said bulged pressure relief portion, said bulged pressure relief portion having an opening area in which said line-of-opening recess is formed, said opening area having a substantially uniform metallic grain structure throughout; and
mechanically removing a portion of metal from said opening area so as to form said line-of-opening recess, said portion of metal being removed without disrupting the substantially uniform metallic grain structure of the remaining metal of said opening area.

35. The method according to claim 34, said line-of-opening recess being formed in said opening area on said concave face.

36. The method according to claim 34, wherein said step of mechanically removing a portion of metal from said opening area being carried out by a mill having a mill diameter of between about 0.020 to about 0.060 inch operating at about 10,000 RPM or greater.

37. The method according to claim 36, wherein said line-of-opening recess is created by a plurality of passes of said mill through said opening area, each consecutive pass increasing the depth of said line-of-opening recess.

38. The method according to claim 34, wherein said line-of-opening recess comprises a singular channel that is substantially U-shaped or substantially V-shaped in cross section.

39. The method according to claim 34, wherein said method further includes the step of creating an area of weakness in said pressure relief portion, said area of weakness being spaced apart from both said opening area and said line-of-opening recess.

* * * * *